(12) United States Patent
Sharma et al.

(10) Patent No.: US 11,463,306 B2
(45) Date of Patent: *Oct. 4, 2022

(54) FAST PROVISIONING IN CLOUD COMPUTING ENVIRONMENTS

(71) Applicant: Google LLC, Mountain View, CA (US)

(72) Inventors: Manoj Sharma, Sunnyvale, CA (US); Choudhury Sarada Prasanna Nanda, Fremont, CA (US); Gururaj Pangal, Pleasanton, CA (US); Maurilio Cometto, Redwood City, CA (US); Ilya Beyer, Mill Valley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,920

(22) Filed: Apr. 14, 2021

(65) Prior Publication Data

US 2021/0258208 A1   Aug. 19, 2021

Related U.S. Application Data

(63) Continuation of application No. 16/135,188, filed on Sep. 19, 2018, now Pat. No. 10,999,135.

(51) Int. Cl.
*H04L 41/0806* (2022.01)
*G06F 9/50* (2006.01)
(Continued)

(52) U.S. Cl.
CPC .......... *H04L 41/0806* (2013.01); *G06F 8/61* (2013.01); *G06F 9/45558* (2013.01); *G06F 9/5077* (2013.01); *G06F 21/62* (2013.01); *H04L 63/102* (2013.01); *H04L 63/20* (2013.01); *G06F 2009/45562* (2013.01); *G06F 2209/5011* (2013.01); *G06F 2221/2141* (2013.01)

(58) Field of Classification Search
CPC ........ G06F 21/62; H04L 63/102; H04L 63/20
See application file for complete search history.

(56) References Cited

U.S. PATENT DOCUMENTS 7,673,139 B1 * 3/2010 Satish ................. G06F 21/6218
713/165
8,769,642 B1 * 7/2014 O'Neill ................... H04L 63/10
726/5
(Continued)

*Primary Examiner* — Douglas B Blair
(74) *Attorney, Agent, or Firm* — Honigman LLP; Brett A. Krueger

(57) ABSTRACT

In one embodiment, a method includes a method for provisioning private-cloud server nodes by receiving a request to provision a specified number of server nodes for a private cloud, wherein the request is associated with a user, identifying a plurality of server nodes including (a) the specified number of hypervisor server nodes from a first pool that includes prepared hypervisor server nodes, each of which includes a previously-installed hypervisor, and (b) a management server node from a second pool that includes prepared management server nodes, each of which includes a previously-installed hypervisor and one or more previously-installed management components, configuring the identified server nodes to use a network associated with the user, creating a private cloud that includes the identified server nodes, and providing, to the user, permission to access the identified server nodes.

20 Claims, 11 Drawing Sheets

(51) Int. Cl.
*G06F 21/62* (2013.01)
*G06F 9/455* (2018.01)
*H04L 9/40* (2022.01)
*G06F 8/61* (2018.01)

(56) References Cited

U.S. PATENT DOCUMENTS

| | | |
|---|---|---|
| 9,110,732 B1 | 8/2015 | Forschmiedt et al. |
| 9,836,496 B1* | 12/2017 | Liu .................... G06F 16/2365 |
| 10,642,715 B1* | 5/2020 | Simca ................. G06F 11/3409 |
| 10,698,711 B2 | 6/2020 | Sobh et al. |
| 10,785,129 B2* | 9/2020 | Greenstein .......... G06F 9/45558 |
| 10,949,559 B1* | 3/2021 | Lee .................... G06F 21/6218 |
| 11,128,629 B2* | 9/2021 | Sharma ................ G06F 21/604 |
| 2002/0103906 A1* | 8/2002 | Knight .................. G06Q 40/02 709/225 |
| 2009/0064280 A1* | 3/2009 | Babeanu ............... G06Q 10/06 726/3 |
| 2009/0172793 A1* | 7/2009 | Newstadt .............. G06Q 40/02 726/6 |
| 2009/0222747 A1* | 9/2009 | May .................... G06Q 10/109 715/764 |
| 2009/0288139 A1* | 11/2009 | Huber .................. H04M 15/73 726/2 |
| 2013/0174223 A1* | 7/2013 | Dykeman ............... G06F 21/10 726/4 |
| 2013/0268588 A1 | 10/2013 | Chang et al. |
| 2014/0006739 A1* | 1/2014 | Dixon .................... G06F 12/14 711/163 |
| 2014/0088979 A1 | 3/2014 | Garman et al. |
| 2014/0094150 A1* | 4/2014 | Huang .................. H04W 12/06 455/411 |
| 2014/0109194 A1* | 4/2014 | Manton ............... H04W 12/082 726/4 |
| 2014/0282894 A1* | 9/2014 | Manton .................. H04L 63/10 726/4 |
| 2014/0337531 A1 | 11/2014 | Naseh et al. |
| 2015/0180894 A1* | 6/2015 | Sadovsky .............. H04L 67/22 726/22 |
| 2015/0195173 A1 | 7/2015 | Gupta et al. |
| 2015/0365437 A1* | 12/2015 | Bell, Jr. ................ H04L 63/20 726/1 |
| 2016/0021019 A1 | 1/2016 | Parikh et al. |
| 2017/0339070 A1 | 11/2017 | Chang et al. |
| 2018/0173742 A1* | 6/2018 | Liu .................... G06F 16/2358 |
| 2018/0212896 A1 | 7/2018 | Chang et al. |
| 2018/0270249 A1* | 9/2018 | Joshi .................... H04L 63/105 |
| 2019/0294463 A1 | 9/2019 | Mukhopadhyay et al. |
| 2019/0306117 A1* | 10/2019 | Cudak .................. H04L 63/108 |
| 2020/0007418 A1 | 1/2020 | Greenstein et al. |
| 2020/0092294 A1* | 3/2020 | Sharma ............... G06F 11/3438 |

* cited by examiner

FAST PROVISIONING IN CLOUD COMPUTING ENVIRONMENTS

CROSS REFERENCE TO RELATED APPLICATIONS

This U.S. patent application is a continuation of, and claims priority under 35 U.S.C. § 120 from, U.S. patent application Ser. No. 16/135,188, filed on Sep. 19, 2018. The disclosure of this prior application is considered part of the disclosure of this application and is hereby incorporated by reference in its entirety.

TECHNICAL FIELD

This disclosure generally relates to use of computer systems in cloud computing environments.

BACKGROUND

Cloud computing environments may provide access to computing resources such as processors, storage devices, and software as services to client systems via communications networks. Cloud computing environments may provide scalable computing resources, with processor and storage capacity being allocated according to demand and may provide security and privacy to prevent unauthorized access to information. The computing resources may include server computer systems connected via networks, associated data storage devices, and software that implements cloud services, such as infrastructure software for managing cloud resources, and application software that uses cloud resources. Each of the server computer systems may be a node of a network. The cloud's physical resources, such as server computer systems and associated hardware, such as storage devices and network routers, may be located in one or more datacenters. A cloud may thus be said to be hosted by one or more data centers.

A cloud computing environment may be categorized as a public cloud or a private cloud. A public cloud may provide computing resources to the general public via the public Internet (though communications may be encrypted for information privacy). Examples of public clouds include the Microsoft Azure™ cloud computing service provided by Microsoft Corporation, the Amazon Web Services™ cloud computing service provided by Amazon.com Inc., and the Google Cloud Platform™ cloud computing service provided by Google LLC. A private cloud may provide computing resources to only particular users via a private network or the Internet, e.g., to only users who are members of or associated with a particular organization, and may use resources in a datacenter hosted by, e.g., on the premises of, the particular organization, or resources hosted in a data center at another location, which may be operated by another organization. As an example, a private cloud may be implemented by a public cloud provider by, for example, creating an Internet-accessible private cloud for which access is restricted to only specific users. As another example, a private cloud may be implemented by an organization using private cloud software on hardware resources (e.g., in a datacenter) hosted by the organization itself (or by other organization). The VMware Cloud™ private cloud software, for example, may be used to implement a private cloud.

Cloud computing resources such as computer systems may be provisioned, e.g., allocated, to clients according to requests received from the clients. For example, a client may request access to a specified number of servers with a specified amount of storage and specified operating system and application software. Cloud providers may provision the resources accordingly and may use virtualization techniques to create one or more virtual instances of physical resources such as server computer systems. Each virtual instance may appear, to clients, to be substantially the same as the physical resource, but the virtual instances may be used more efficiently by the cloud provider to fulfill client requests. For example, multiple virtual instances of a physical server may be provided to multiple corresponding users at the same time, and each virtual instance may appear, to its user, to be the same as the physical resource. Virtual instances of a physical server may be created and managed by a hypervisor executing on the physical server. An example hypervisor is the VMware ESXi™ hypervisor provided by VMware Inc. Each virtual instance may be referred to as a virtual machine (VM). An operating system may execute in a virtual machine, and application software may execute in the virtual machine using the operating system.

SUMMARY

In particular embodiments, a fast cloud provisioning technique may be used to efficiently create clouds of servers in cloud computing environments. Cloud computing environments provide computing resources as cloud services that can be accessed by client systems via communication networks. A cloud may include a specified number of server nodes. Prior to use, a cloud may be provisioned, which may involve installing and configuring software packages on computer systems that are to become the server nodes in the cloud. Thus, provisioning a cloud may involve provisioning each of the server nodes to be included in the cloud.

In particular embodiments, a cloud computing system may provision a cloud in response to a cloud provisioning request. Server nodes may be provisioned by, for example, installing and configuring software on the server nodes, such as virtualization software and other software used by the cloud. Since a provisioning request may be generated when a user invokes a command to create or expand a cloud, the user is likely to be waiting for the provisioning to be completed. Preparing nodes may be time-consuming, so the cloud computing system may prepare server nodes prior to receiving provisioning requests. The prepared server nodes may be used to satisfy the provisioning request, so the time-consuming preparation process need not be performed while the user is waiting for the provisioning to complete. To prepare server nodes prior to receiving provisioning requests, the cloud computing system may, at predetermined times, identify free server nodes in an inventory of server nodes, install suitable software on the identified server nodes, perform appropriate configuration, and add the prepared server nodes to one or more pools of prepared server nodes.

In particular embodiments, there may be two or more different types of prepared nodes. Each of these prepared node types may correspond to a set of software packages, e.g., computer program code and data, that are installed on the node. The software packages may be installed on each node by a preparation process. The number of nodes of each prepared node type may be determined, at least in part, according to a ratio between the prepared node types. For example, if M nodes of a first prepared type are to be prepared, and 1 node of a second prepared type is to be prepared, then the prepared type ratio may be M:1. The prepared type ratio may also correspond to a percentage of nodes of a first type that are to be prepared. As an example, a preparation percentage of 77% nodes of a first type may indicate that 77 of every 100 nodes in an inventory may be prepared as the first type, and 33 percent of every 100 nodes in the inventory may be prepared as the second type.

The embodiments disclosed above are only examples, and the scope of this disclosure is not limited to them. Particular embodiments may include all, some, or none of the components, elements, features, functions, operations, or steps of the embodiments disclosed above. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed includes not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1A:
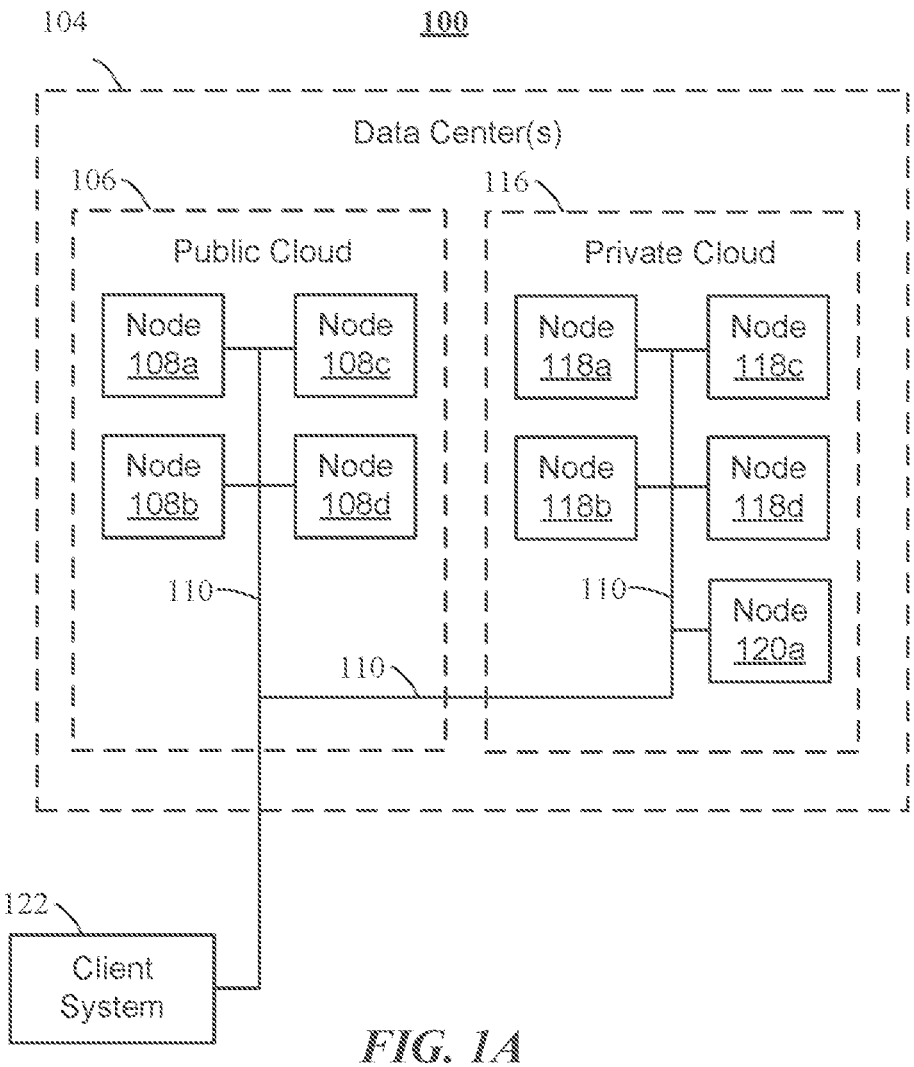
FIG. 1A illustrates an example Private Cloud as a Service (PCAAS) computing environment.

FIG. 1A illustrates an example Private Cloud as a Service (PCAAS) computing environment 100. PCAAS 100 may include a public cloud 106, a private cloud 116, and a client system 122. Public cloud 106 may be hosted in one or more data centers 104. The PCAAS computing environment 100 may provide for sharing of resources, such as application and data, between the public cloud 106 and the private cloud 116. Private cloud 116 may also be hosted in one or more data centers 104, which may be the same or different as the data center(s) 104 in which public cloud 106 is hosted. Public cloud 106 includes server nodes 108a-d and may be, e.g., Microsoft Azure™ or the like. Private cloud 116 includes server nodes 118a-d and management server node 120a. The server nodes 108 of the public cloud 106 may be hosted in one or more data centers that are different from one or more data centers in which the server nodes 118 of the private cloud 116 are hosted. Alternatively, one or more server nodes 108 of the public cloud 106 may be hosted in the same data center as one or more server nodes 118 of the private cloud 116. Server nodes 108, 118, and 120 may be computer systems connected to each other by a network 110. Each of the server nodes 108, 118, 120 may have at least one processing unit, and may also have one or more storage devices, such as a disk drive, flash storage drive, or the like. Private cloud 116 may be, e.g., VMware Cloud™ or the like. Each of the server nodes 108, 118, 120 may execute a hypervisor such as the VMware ESXi™ hypervisor, the Microsoft Hyper-V™ hypervisor, or other suitable hypervisor. Each of the server nodes 108, 118 may use the hypervisor to execute virtual machines (VMs), operating systems, and software applications. Management node 120a in private cloud 116 may provide management services for the private cloud 116, e.g., resource management, VM management, VM deployment, task scheduling, statistics and logging, and server node management. Software that provides the management services may execute on management node 120a. The management services on management node 120a may be provided by the VMware vCenter Server® management platform, for example.

Although FIG. 1A illustrates a particular arrangement of server nodes in public cloud 106 and private cloud 116, this disclosure contemplates any suitable arrangement of server nodes in public cloud 106 and private cloud 116. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

The network 110 may include one or more network links. In particular embodiments, one or more links of the network 110 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links. The links need not necessarily be the same throughout PCAAS computing environment 100.

In particular embodiments, client system 122 may be an electronic device including hardware, software, or embedded logic components or a combination of two or more such components and capable of carrying out the appropriate functionalities implemented or supported by client system 122. As an example and not by way of limitation, a client system 122 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 122 may enable a network user at client system 122 to access network 110. A client system 122 may enable its user to communicate with other users at other client systems 130.

Figure 1B:
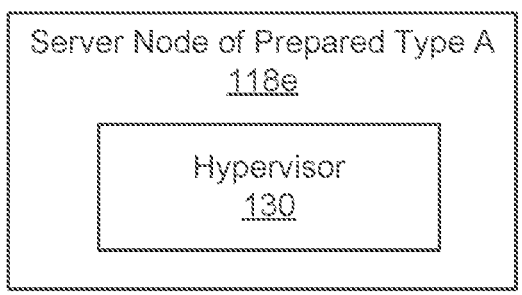
FIG. 1B illustrates an example prepared server node.

FIG. 1B illustrates an example prepared server node 118e. The prepared server node 118e is of a prepared type referred to herein as "prepared type A." The prepared server node 118e includes a hypervisor 130 to indicate that hypervisor software, e.g., ESXi or the like, has been installed on the prepared server node 118e by a preparation process. Configuration operations may also have been performed on the prepared server node 118e. The prepared server node 118e may subsequently be provisioned by a provisioning process and added to the private cloud 116. When the prepared server node 118e has been provisioned and added to the private cloud 116, it may execute program code instructions of the hypervisor 130, which may create and manage one or more virtual machines. Each virtual machine may execute an instance of an operating system (OS) and instances of one or more applications.

Figure 1C:
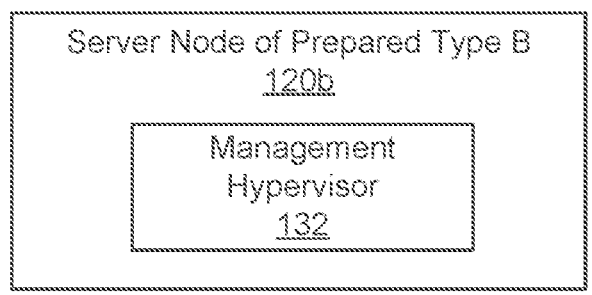
FIG. 1C illustrates an example prepared management server node.

FIG. 1C illustrates an example prepared management server node 120b. The prepared management server node 120b is of a prepared type referred to herein as "prepared type B." The prepared management server node 120b includes a management hypervisor 132 to indicate that hypervisor software, e.g., VMware ESXi™ or the like, and management software components for managing the private cloud 116, e.g., the VMware vCenter Server® management platform or the like, have been installed on the prepared management server node 120b by a preparation process. As another example, the VMware ESXi™, PSC, vCenter Server®, and DNS software components may have been installed on the prepared management server node 120b by the preparation process. Configuration operations may also have been performed on the prepared management server node by the preparation process or other suitable process.

In particular embodiments, the prepared management server node 120b may be provisioned by a provisioning process and added to the private cloud 116. When the prepared management server node 120b has been provisioned and added to the private cloud 116, it may execute program code instructions of the management hypervisor 132, which may create and manage one or more virtual machines, and may also execute program code instructions of the management software components. Thus, when the prepared management server node 120b has been added to the private cloud 116, each virtual machine on the management server node 120b may execute an instance of an operating system (OS) and instances of one or more applications, which may include instances of the management software components. When the management server node 120b has been provisioned and added to the private cloud 116, the management hypervisor 132 may execute the management components to provide management services for the private cloud 116, e.g., resource management, VM management, VM deployment, task scheduling, statistics and logging, and server node management, as described above.

Figure 1D:
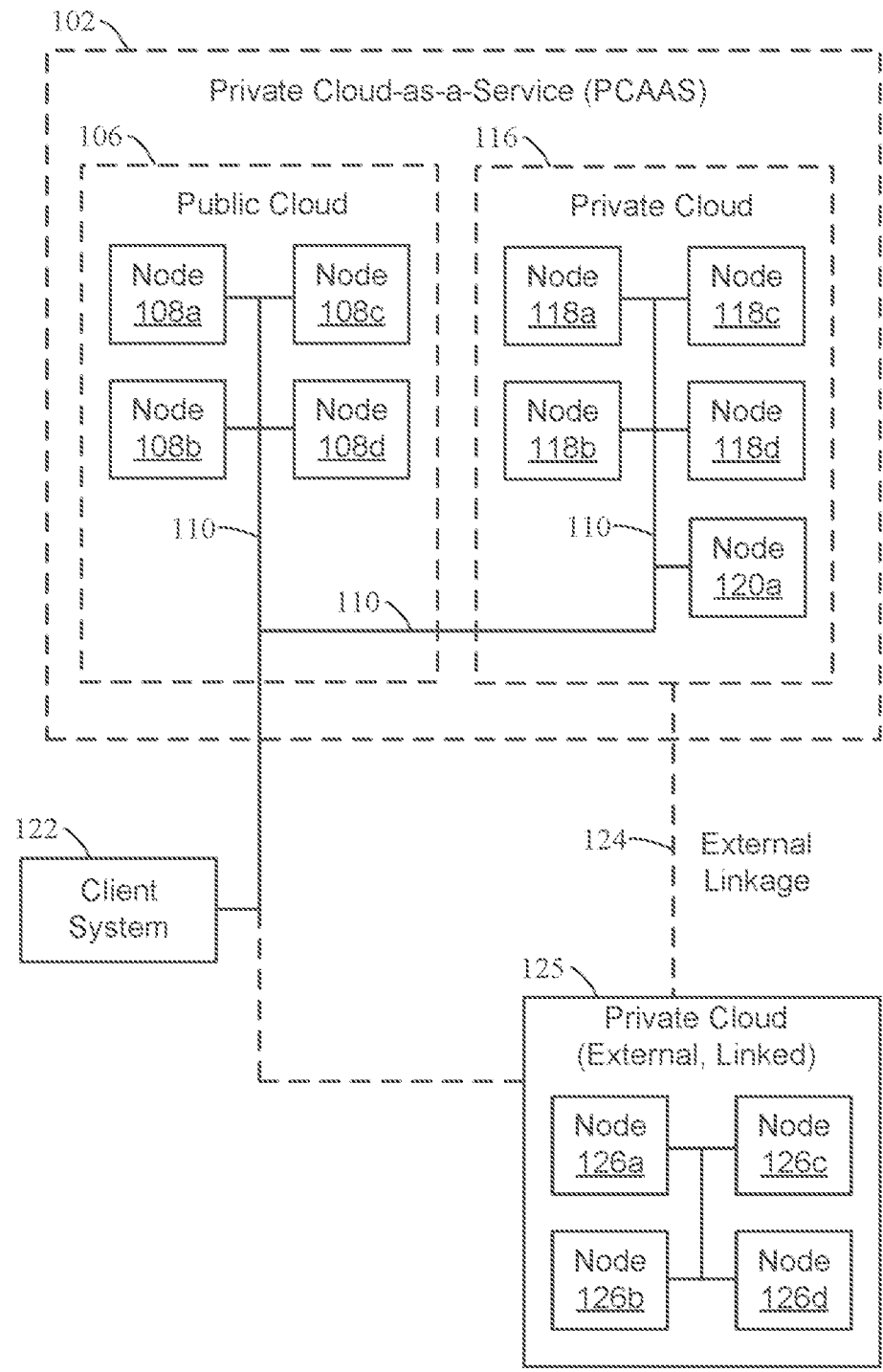
FIG. 1D illustrates an example PCAAS computing environment having connectivity to one or more external private cloud environments.

FIG. 1D illustrates an example PCAAS computing environment 102 having connectivity to one or more external private cloud environments 125. The external private cloud environments 125 may include nodes 126a-d. The PCAAS computing environment 102 may include or be associated with a public cloud 106 and a private cloud 116, and may provide networking and management connectivity with one or more external private cloud environments 125 that are not hosted by the provider of the PCAAS computing environment 102. This connectivity with external private cloud environments 125 may be provided by an external linkage 124, which may be used in a "linked mode" of the PCAAS computing environment 102. In linked mode, user accounts and credentials from external private cloud environments 125 may be used to authenticate users with the PCAAS private cloud 116 without requiring corresponding accounts and credentials to be explicitly created in the PCAAS private cloud 116. Further, a single (e.g., common) interface provided by (e.g., served by) management components on the external private cloud and/or on the PCAAS private cloud may be used to manage the external private cloud environments and the PCAAS private cloud. The interface may be a user interface (e.g., a management portal interface), an application programming interface, a service-oriented interface, or the like. The external private cloud environment 125 may be, for example, a private cloud running in a customer-controlled environment, a PCAAS private cloud at the same location as the private cloud 116, or at a different location from the private cloud 116, or a private cloud running in a management-provider-controlled environment, which may be created and operated exclusively for a single consumer organization.

Figure 2A:
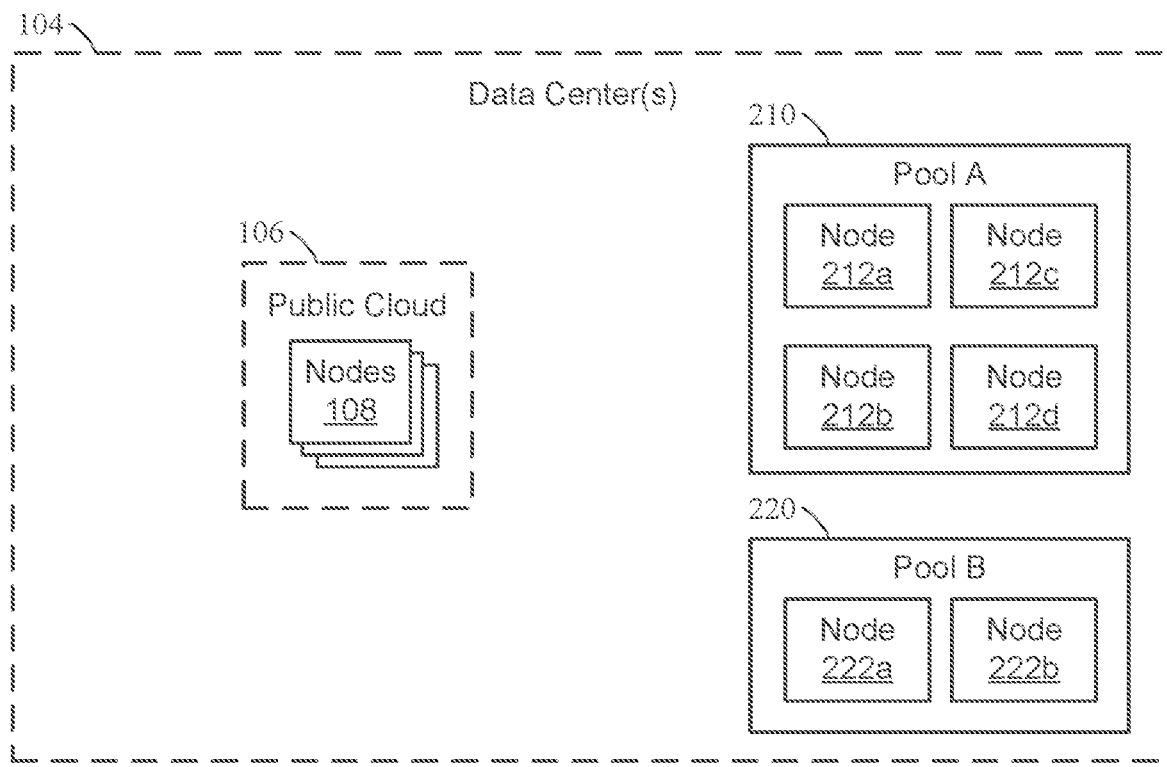
FIG. 2A illustrates an example public cloud and pools of provisioned server nodes.

FIG. 2A illustrates an example public cloud 106 and pools 210, 220 of provisioned server nodes. Public cloud 106 may include one or more server nodes 108 in one or more data centers 104, as described above with reference to FIG. 1A. In particular embodiments, data center(s) 104 may include node pools 210, 220 of two prepared types. Pool A 210 is a pool of prepared type A, which includes hypervisor server nodes 212 on which hypervisors have been installed, similar to the prepared server node 118e of FIG. 1B described above. Pool B 220 is a pool of prepared type B, which includes management server nodes 222 on which management hypervisors have been installed, similar to the prepared management server node 120b of FIG. 1C described above. Each pool 210, 220 of prepared nodes may be represented using a data structure that includes a list of available prepared server nodes of a corresponding prepared node type. The prepared nodes 212, 222 may be added to the respective pools 210, 220 by a preparation process such as that shown in FIG. 5, which may identify free nodes in a free node inventory, prepare the free nodes, and add the resulting prepared nodes to a corresponding pool. The free nodes in the free node inventory may be server nodes that have not previously been used, e.g., new server nodes, or server nodes that have been removed from other clouds and added to the free node inventory by a process such as that shown in FIG. 7. Although four prepared server nodes 212 are shown on Pool A 210, any suitable number of server nodes 212 may be included in Pool A 210. Similarly, although two prepared management server nodes 222 are shown in Pool B 220, any suitable number of management server nodes 222 may be included in Pool B 220.

Figure 2B:
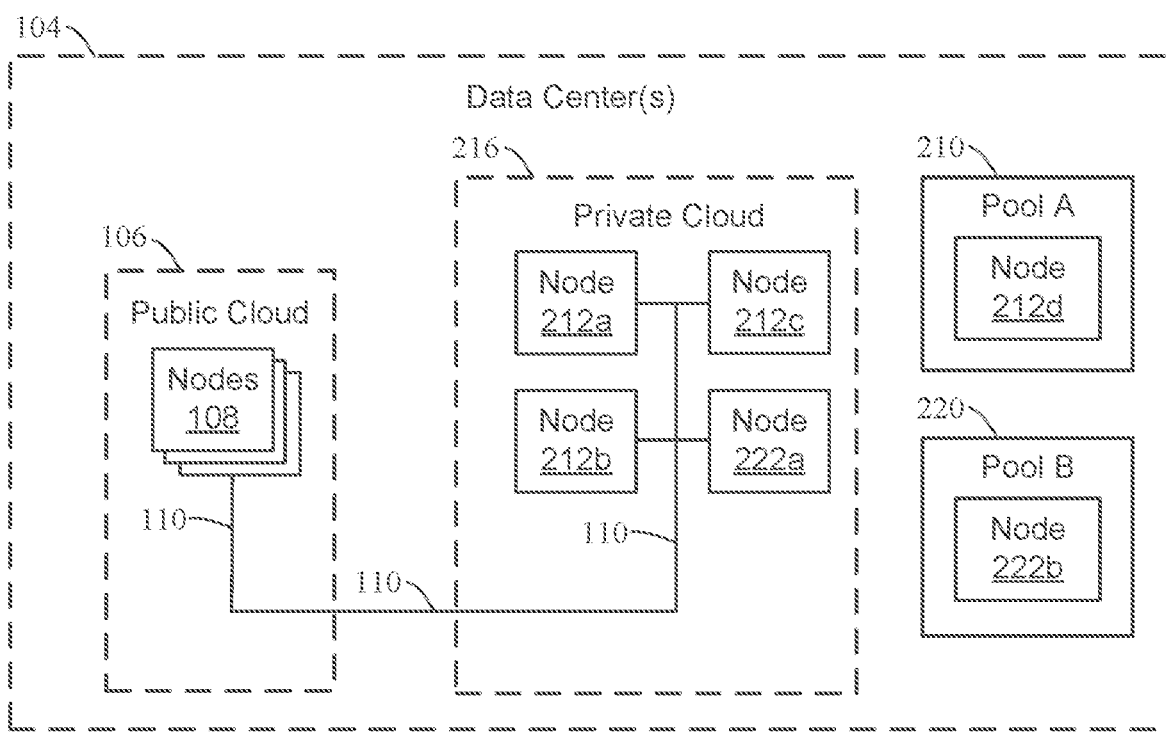
FIG. 2B illustrates an example public cloud, private cloud, and pools of provisioned server nodes subsequent to adding server nodes to a private cloud.

FIG. 2B illustrates an example public cloud 106, private cloud 216, and pools 210, 220 of provisioned server nodes subsequent to adding server nodes to a private cloud 216. Provisioning a private cloud 216 may involve allocating a cloud provider's resources to a user, and creating the private cloud 216 from the resources. In particular embodiments, a fast cloud provisioning technique may be used to efficiently create clouds of servers in a cloud computing environment. As introduced with reference to FIG. 1A, a private cloud 216 may include a set of server nodes 212, 222 that provide computational resources to cloud users, who may access the private cloud 216 via the client system 122. A user may request that a private cloud 216 be created or expanded, e.g., by a specified number of server nodes, and the cloud provider may create the private cloud 216 by allocating the specified number of server nodes to the user and adding the server nodes to the private cloud 216. The request to create the private cloud 216, which is referred to herein as a provisioning request, may be received and processed by a management component or other component of the cloud computing system.

In particular embodiments, with reference to FIG. 2A, when a request is received to provision a private cloud 216, the system management component may allocate prepared server nodes 212, 222 from pools 210, 220 to the private cloud 216 by determining how many server nodes of each prepared type are needed and, for each prepared type, identifying the prepared nodes in a node pool 210, 220 that corresponds to the prepared type. For example, the system management component may identify the needed number of free prepared type A server nodes 212 in pool A 210, and the needed number of free prepared type B server nodes 222 in pool B 220.

In particular embodiments, the number of nodes of each prepared node type may be determined, at least in part, according to a ratio between the prepared node types. For example, if M nodes of a first prepared type are to be prepared, and 1 node of a second prepared type is to be prepared, then the prepared type ratio may be M:1. The prepared type ratio may also correspond to a percentage of nodes of a first prepared node type that are to be prepared. As an example, a preparation percentage of 77% nodes of a first type may indicate that 77 of every 100 nodes in an inventory may be prepared as the first prepared node type, and 33 percent of every 100 nodes in the inventory may be prepared as the second prepared node type.

In particular embodiments, each of the prepared nodes may be added to a pool of prepared nodes. There may be a separate pool for each prepared node type, in which case the nodes of the first type may be added to a Type A pool and the nodes of the second type may be added to a Type B pool. Further, since server nodes of different prepared types may have different features and perform different operations, the particular software packages installed on a server node may depend on the server node's prepared type. For example, management software packages (which may include hypervisors and guest operating systems, as appropriate) may be installed on nodes of the first prepared type, and hypervisors (and guest operating systems, as appropriate) may be installed on nodes of the second prepared type.

As another example, suppose a prepared type ratio is 3 server nodes of a prepared type A to 1 server node of a prepared type B. The number of needed prepared type A server nodes may then be 3, so 3 prepared type A server nodes 212a-c in Pool A 210 are identified. In this example, the number of needed prepared type B server nodes is 1, so 1 prepared type B server node 222a in Pool B 220 is identified. In particular embodiments, one or more nodes to be included in a target private cloud may be identified in a pool according to a policy based on the physical locations of candidate nodes. For example, the policy may use the physical location of a node in a rack, and identify candidate nodes that are at most a desired physical distance from another node that is allocated to the target private cloud, e.g., "affinity", for performance purposes. Another policy might identify candidate nodes that are at least a desired distance from another candidate node that is allocated to the private cloud (e.g., "anti-affinity"), for availability and failure tolerance purposes. The identified prepared type A server nodes 212a-c may be removed from Pool A 210 and added to the private cloud 216. Similarly, the identified type B server node 222a may be removed from Pool B 220 and added to the private cloud 216.

In particular embodiments, after the server nodes 212a-c, 222a are added to the private cloud 216 and removed from their respective pools 210, 220, Pool A 210 includes the remaining server node 212d, and Pool B 220 includes the remaining server node 222b, as shown in FIG. 2B. Subsequent provisioning requests may use these remaining server nodes, and additional server nodes may be added to the pools 210, 220. As an example, if a subsequent provisioning request specifies that more than one server node from Pool A 210 is to be added to a private cloud, then a free node not in the pool 210 may be identified, e.g., in a free node inventory, and the appropriate software installed on the free node to generate a prepared node. The prepared node may then be added to the private cloud. The cloud computing system may prepare nodes and add the prepared nodes to the pools 210, 220 using the provisioning process of FIG. 5, so that the time-consuming process of preparing (e.g., installing and configuring) server nodes at provisioning time may be avoided.

In particular embodiments, a private cloud 216 of M nodes, where M>1, may be pre-created, and both the hypervisor installs/configurations and management installs/configurations may be performed prior to receiving a provisioning request. Then, when a request to provision a private cloud 216 of N nodes is received, wherein N>M, the existing private cloud 216 of M nodes may be made available to the user. The user may begin using this private loud 216. The cloud computing system may then add the remaining nodes (N−M) to the private cloud 216 in the background, which may occur while the user is interacting with the private cloud 216.

In particular embodiments, a user of a private cloud 216 of M nodes may request that additional an additional number of nodes, e.g., X nodes, be added to the private cloud 216. That is, after the user has obtained and has been using a private cloud 216 of M nodes, they may request an expanded private cloud 216 of N nodes, where N=M+X. The cloud computing system may move nodes from the pool of pre-provisioned nodes and to the private cloud 216 of the user.

In particular embodiments, a user of a private cloud 216 of M nodes may experience a failure of X nodes (X>=1) of the private cloud 216. The failure may include, for example, failure of disks, memory, network interface cards (NICs), or any other component of a node or other hardware device of the private cloud 216. The system may automatically initiate a replacement of the failed node(s). Alternatively, the provider of the cloud computing system (e.g., the private cloud provider) may manually (e.g., using human personnel) initiate a replacement of these failed nodes. In this scenario, nodes may be moved from the pool of pre-provisioned nodes to the private cloud 216 of the user.

In particular embodiments, a private cloud 216 may have management external linkages 124 to other environments that are present in external environments and associated with a user, such as on-premises environments. The other environments may be, for example, the external private cloud environments 125 shown in FIG. 1D. Such linkages may enable the user to manage both the private cloud 216 and the other environments using a common management interface. Such linkages may be established at the time of creation or allocation of a pre-created private cloud 216 to a user. However, it may not be possible to prepare the management components in advance of establishing linkages, in which case the cloud computing system may prepare the management components by linking them to another environment. When the user requests the private cloud 216 to be created, the linkages may then be broken and re-established with the other environments of the user.

Figure 3:
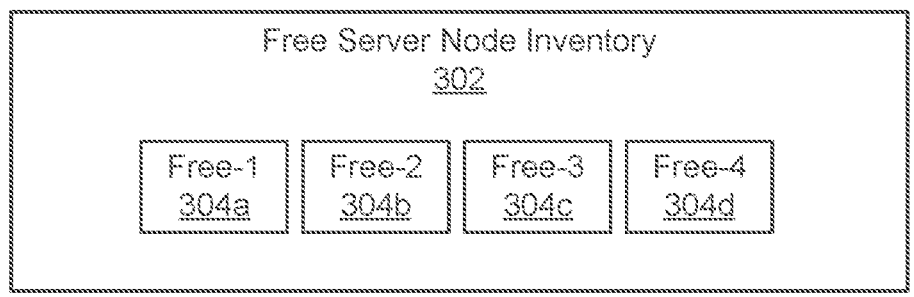
FIG. 3 illustrates example free server nodes and pools of prepared server nodes.
Figure 3:
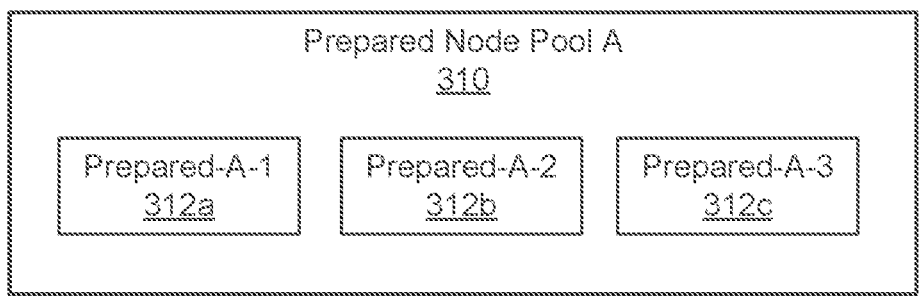
Figure 3:
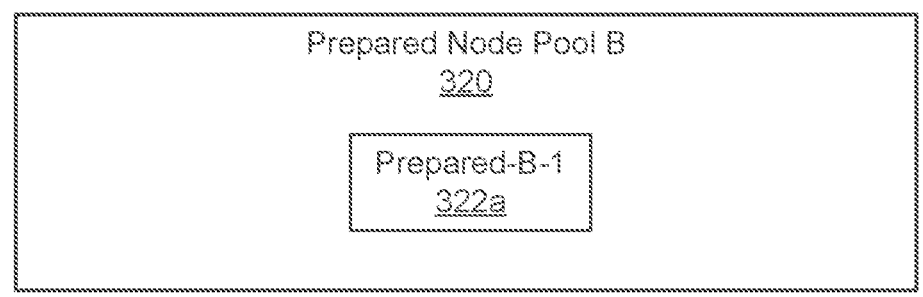

FIG. 3 illustrates example free server nodes and pools of prepared server nodes. An example free server node inventory 302 includes a list of free server nodes 304, which may be server nodes that have not been provisioned. There are four free server nodes 304a-d in the inventory 302. The inventory 302 may be represented as a list of free server nodes 304, for example. The free server nodes 304 listed in the inventory 302 may represent actual server nodes, which may be located in one or more data centers. Free server nodes 304 may be converted to prepared nodes and moved from the inventory 302 to prepared node pools 310, 320 by a preparation process, as described below.

An example prepared node pool 310 ("Pool A") includes a list of prepared server nodes 312a-c of a prepared type "A." Another prepared node pool 320 ("Pool B") includes a server node 322a of a prepared type "B." The prepared server nodes 312, 322 may represent actual server nodes, which may be located in one or more data centers. The prepared type "A" node(s) may be, for example, user nodes for performing user-defined computations. The prepared type "B" node(s) may be, for example, management node(s) for performing management tasks and/or user-defined computations. in the example of FIG. 3.

In particular embodiments, there may be a prepared node pool for each prepared node type. The free nodes 304 may be allocated to the prepared node pools 310, 320 according to a prepared type ratio. The prepared type ratio may be a ratio of nodes of a first prepared type (e.g., "type A") to nodes of a second prepared type (e.g., "type B"). The prepared type ratio may be used to determine how many nodes of each prepared type are to be included in the pool that corresponds to the prepared node type. For example, a ratio of 3:1 may specify that 3 nodes of prepared type A are to be allocated to Pool A 310 for each node of prepared type B allocated to Pool B 320. In FIG. 3, prepared nodes 312, 322 have been allocated to Pools A 310 and B 320 according to this example 3:1 ratio.

In particular embodiments, the prepared nodes 312, 322 may have been identified in the free server node inventory 302 as free nodes 304 and prepared, e.g., by a preparation process. The preparation process may have removed four identified free nodes 304 from the inventory 302, prepared three of the identified free nodes 304 to produce prepared nodes 312a-c, and prepared one of the identified free nodes 304 to produce prepared node 322a. The preparation process may also have added the prepared nodes 312a-c to Pool A 310 and the prepared node 322a to Pool B 320. Note that descriptions herein such as "allocating" or "adding" a server node to a pool or inventory, or "removing" a server node from a pool or inventory refer to adding or removing a reference to the server node, such as a host name or other identifier for the server node, to a list or other suitable data structure.

Figure 4:
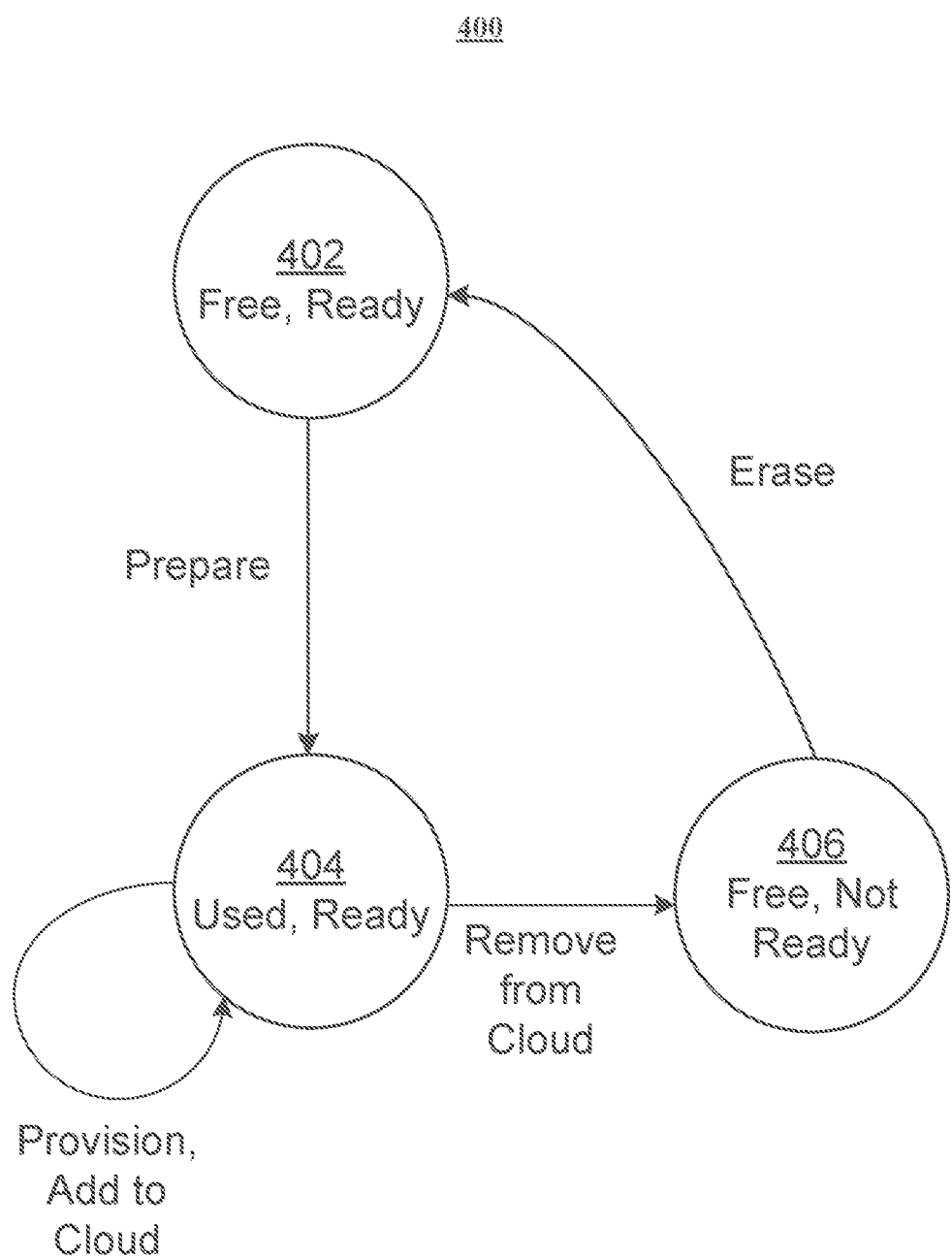
FIG. 4 illustrates example state transitions of a server node.

FIG. 4 illustrates example state transitions of a server node. A server node may be in one of the following states: a free, ready state 402, a used, ready state (404), or free, not ready state 406. Server nodes in the free, ready state 402 may be listed in the free inventory 302, and may be ready to be prepared. A preparation process may be performed on a node in the free, ready state 402 to cause the node to transition to the used, ready state 404. A node in the used, ready state 404 may be a prepared node that is ready for provisioning. A prepared node in the used, ready state 404 may be provisioned by a provisioning process to cause the node to become ready to be added to a cloud while remaining in the used, ready state 404. Further, a node that is ready to be added to a cloud may be added to the cloud while remaining in the used, ready state 404. A node in the used, ready state 404 may be removed from the cloud, e.g., when the size of the cloud is reduced or the node is otherwise removed from the cloud, to cause the node to transition to a free, not ready state 406. A node in the free, not ready state 406 is not in a cloud, but sensitive or confidential information may be stored on a node's storage device. Thus, the storage device of a node in the free, not ready state 406 may be securely erased, When the node has been securely erased, it may be returned to the free, ready state 42 and again listed in the free inventory 302.

Figure 5:
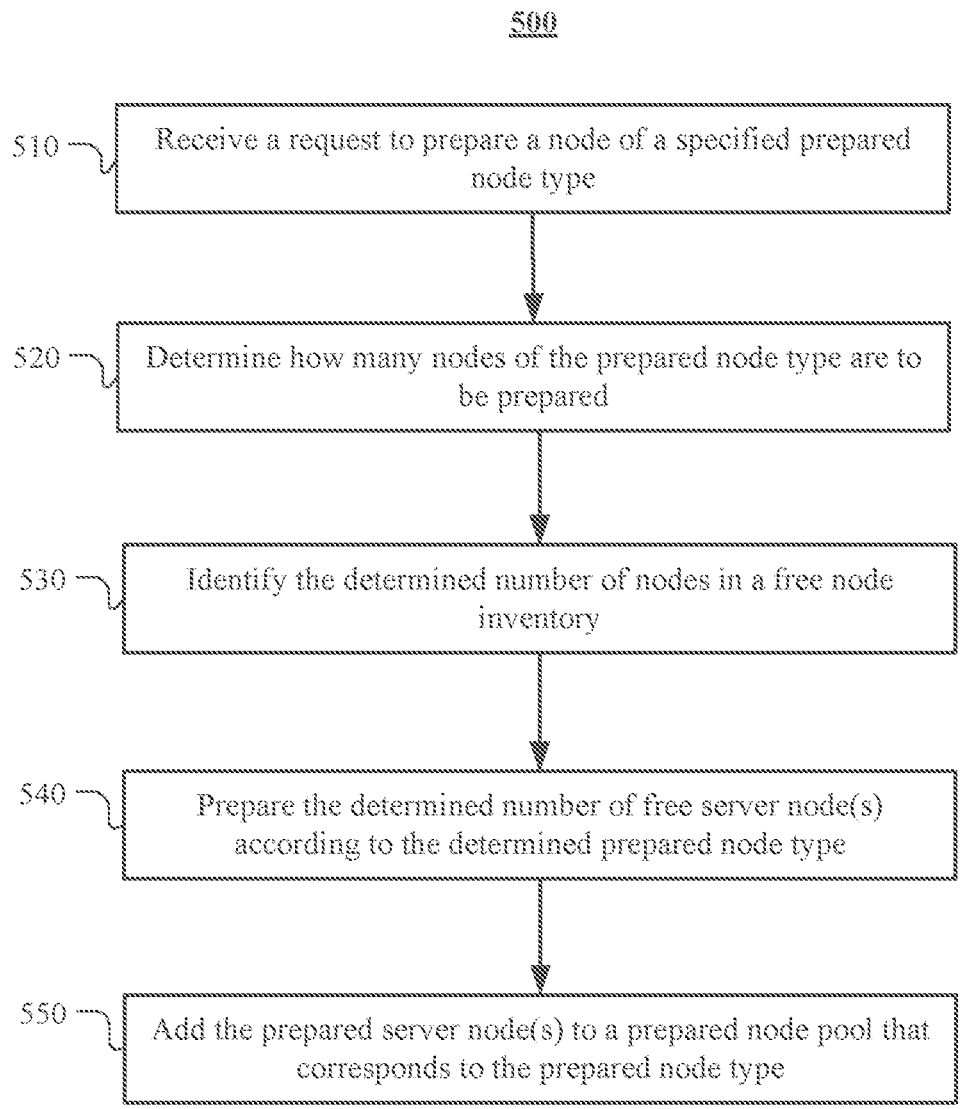
FIG. 5 illustrates an example method for preparing cloud server nodes for subsequent provisioning.

FIG. 5 illustrates an example method 500 for preparing cloud server nodes for subsequent provisioning. The method 500 may be performed by a process that may execute on one or more server node. The method 500 may begin at step 510 by receiving a request to prepare a node of a specified prepared node type. At step 520, the method may determine how many nodes of the type are to be prepared. The number of nodes of the prepared node type may be determined based on a prepared type ratio between the number of prepared nodes to be included in node pools that correspond to the prepared node types. The number of nodes of the prepared node type may also be determined based on the number of free nodes in a free node inventory. For example, the number of nodes to be prepared for each prepared node type may be determined by dividing the free nodes according to the prepared type ratio. For example, an inventory of 100 free nodes may be allocated between two prepared node types according to a 3:1 ratio by allocating 77 nodes to a first node type and 33 nodes to a second node type.

At step 530, the method may identify the determined number of free server nodes in a free node inventory. For example, if the specified prepared node type received at step 510 is the first node type, then 77 nodes of the first node type may be identified in the free node inventory at step 530. In particular embodiments, the method, or steps of the method, such as steps 520-550, may be repeated to identify and prepare free nodes for each prepared node type.

At step 540, the method may prepare the determined number of free server nodes according to the determined prepared node type by. As an example, step 540 may install and configure software on each of the free server nodes identified at step 530. The software to be installed and the configuration to be performed on each server node may be identified based on the prepared node type. Step 540 may also set the state of each prepared node to used, ready.

At step 550, the method may add the prepared node(s) to a prepared node pool that corresponds to the prepared node type, e.g., by adding a reference to each of the prepared nodes to a pool associated with the prepared type of the prepared node. Step 550 may also remove the prepared node from the free node inventory. In particular embodiments, there may be an upper limit on the number of prepared nodes in a pool to avoid using resources unnecessarily. As an example, requests to prepare a node or add a node to a pool that would result in exceeding the pool's upper limit may be denied without preparing or adding any nodes to the pool.

In particular embodiments, the cloud computing system may perform other operations as needed to prepare the server nodes 212*a-c*, 222*a* so those nodes may eventually be provisioned to operate in the private cloud 216. For example, the system management component may perform configuration operations when the private cloud 216 is being prepared and/or provisioned. The server nodes 212, 222 may be configured for operation by, for example, setting networking parameters on the server nodes 212, 222 and associating the server nodes with the user's account information. As another example, the prepared server nodes 212, 222 may use the network 110 of the private cloud provider until they are added to the private cloud 216, at which point their networking configuration may be changed to use the user's network instead. The user's network may be a software-defined virtual network (e.g., a level 2 virtual network) layered above the network 110. Subsequent to the network configuration change, the cloud computing system may configure user accounts and role-based access control policies on the server nodes 212*a-c*, 222*a*, and install and configure software-defined virtual storage (e.g., VSAN) on the server nodes 212*a-c*, 222*a*.

In particular embodiments, the cloud computing system may install other software on one or more of the server nodes 212*a-c*, 222*a* when the cloud 216 is being provisioned, such as software that may be installed in a short period of time, software that may be difficult to pre-install because of pre-requisites that are not satisfied at the time the pre-installation is performed, or software for which installation need not be complete by the time the provisioning is complete. As an example, additional software components for which installation need not be complete by the time the provisioning is complete may be installed in an asynchronous manner, so that installation of such components begins when the cloud is being provisioned and may continue after provisioning is complete. Software components that may be installed asynchronously in this way include software-defined virtual networking (e.g., the VMware NSX™ network virtualization and security component) and additional cloud management software (e.g., the VMware vRealize® Operations™ cloud operations management component).

In particular embodiments, prepared server nodes 212, 222 may be prepared and added to respective pools 210, 220 automatically. For example, the cloud computing system may evaluate a threshold replenishment condition based on the number of server nodes in each prepared node pool 210, 220 each time a node is removed from one of the pools and, when a threshold condition is satisfied, e.g., the number of server nodes in the pool falls below a threshold number, determine how many server nodes to add to the pool, identify the determined number of free nodes, install and configure the appropriate software on the identified nodes, and add the identified nodes to their corresponding pools.

In particular embodiments, the number of server nodes in a pool may be based on a pool capacity management policy. The number of nodes in the pool may be changed by, for example, adding nodes to the pool or removing nodes from the pool so that the pool contains a number of nodes determined according to the pool capacity management policy. The pool capacity management policy may be based on available capacity of the pool, such as the number of nodes in the pool, and/or the computational capacity of the nodes in the pool. The pool management policy may also be based on observed demand, which may include a rate at which the nodes are being consumed (e.g., provisioned) as well as sizes of private clouds being created or previously created (e.g., number of nodes and/or sum of computational capacities of the nodes in one or more private clouds), or other properties of private clouds. Further, based on such parameters, the cloud computing system may create a purchase trigger to an external environment or a human to initiate a physical capacity procurement and expansion process, so that more nodes may subsequently be obtained (e.g., purchased) and added to the pool.

In particular embodiments, to maintain the prepared node ratio across the prepared node pools, the system management component or other process may rebalance the pools by adding or removing nodes to or from one or more pools. If there is an excess of machines in a pool, so that the ratio is not satisfied, then machines may be released from the pool, added to other pools, or moved from the pool to other pools to maintain the ratio. For example, a system management component or other process may determine whether the pool sizes satisfy the prepared type ratio. As another example, when one or more nodes are added to or removed from at least one of the pools, so that the number of nodes in at least one of the pools changes, a process may determine whether the pool sizes satisfy the prepared type ratio after the change. If the pool sizes do not satisfy the ratio, e.g., if there are 9 nodes in Pool A and 2 nodes in Pool B, then nodes may be added or removed to re-balance the pools. For example, if the prepared type ratio is 4:1, then 1 node may be removed from Pool A to satisfy the ratio (resulting in 8 nodes in Pool A and 2 nodes in Pool B), or 3 nodes may be added to Pool A and 1 node may be added to Pool B to satisfy the ratio (resulting in 12 nodes in Pool A and 3 nodes in Pool B).

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for preparing cloud server nodes for subsequent provisioning including the particular steps of the method of FIG. 5, this disclosure contemplates any suitable method for preparing cloud server nodes for subsequent provisioning including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
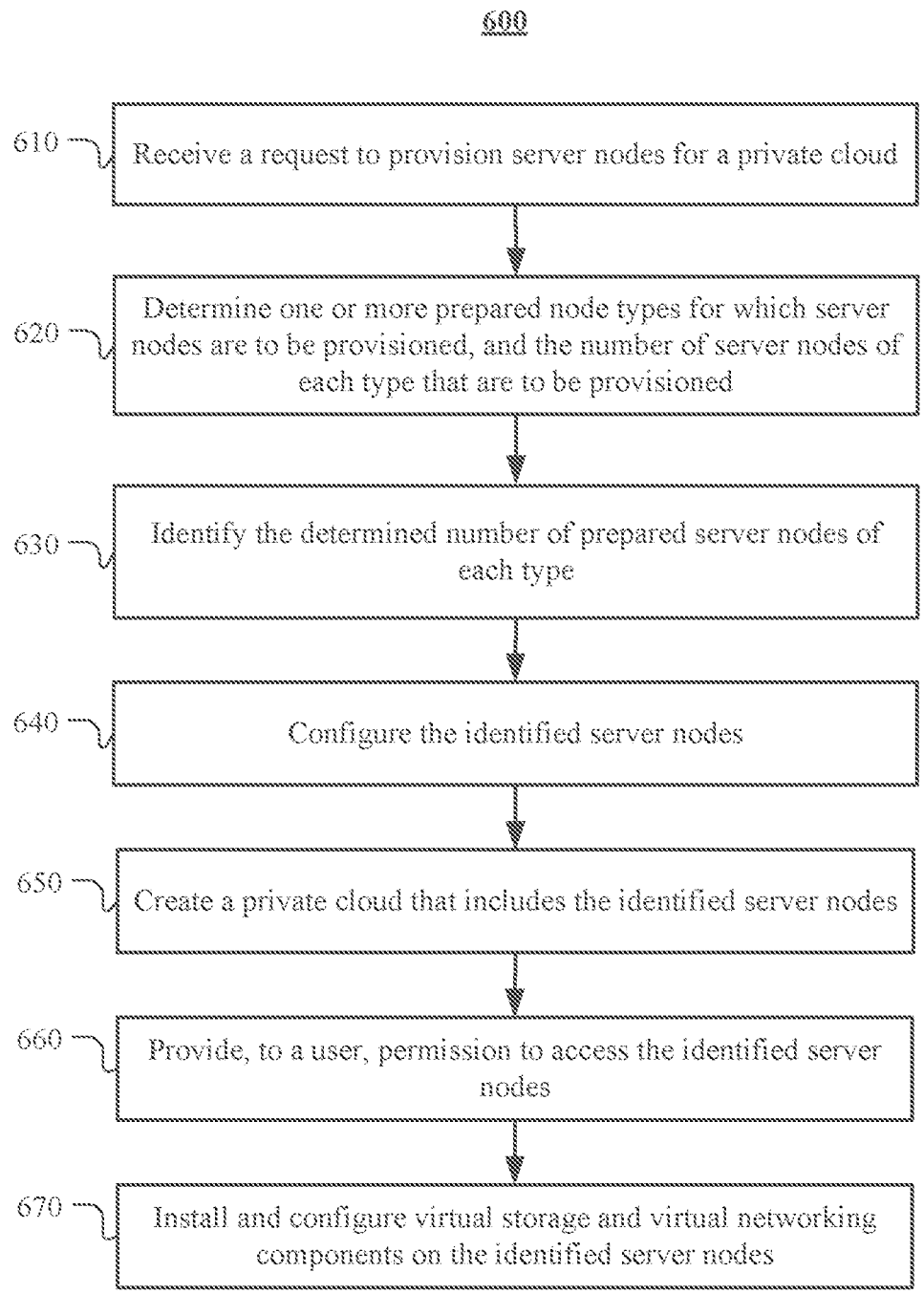
FIG. 6 illustrates an example method for provisioning a private cloud.

FIG. 6 illustrates an example method 600 for provisioning a private cloud. The method may be performed by, for example, a system management component or other component of the private cloud, and may execute on one or more server nodes. The method may begin at step 610 by receiving a request to provision a server node 212 for a private cloud. The request may be associated with a user. At step 620, the method may determine one or more prepared node types for which server nodes are to be provisioned, and the number of server nodes of each type that are to be provisioned. The prepared node types may be determined based on, for example, the particular software components that are to be used to provide the private cloud.

At step 630, the method may identify, in one or more pools, one or more prepared server nodes of each type. In particular embodiments, the cloud computing system may search or otherwise query one or more pools of prepared nodes to identify prepared nodes of the prepared type(s) determined at step 620. If there is a sufficient number of nodes of each prepared type in the corresponding pool to satisfy the request, then the server nodes of each type may be removed from the pool and added to the cloud being provisioned. If there is not a sufficient number of nodes of a prepared type in a pool, then additional nodes may be prepared and added to the pool so that the pool has sufficient nodes to satisfy the request.

At step 640, the method may optionally configure the identified prepared server nodes. For example, the method may configure the server nodes to use a network associated with the user, such as a software-defined virtual network. At step 650, the method may create a private cloud that includes the identified prepared server nodes. Step 650 or a prior step of the method may also remove the identified prepared server nodes from their pool(s), e.g., by removing the references to the identified prepared server nodes from the associated pools. In particular embodiments, the identified prepared server nodes may use the network of the private cloud provider until they are added to the private cloud at step 650, at which point their networking configuration may be changed to use the user's network instead.

At step 660, the method may provide, to the user, permission to access the identified prepared server nodes. At step 670, the method may install and configure virtual storage and virtual networking components on the identified prepared server nodes and perform other configuration operations as appropriate.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for provisioning a cloud including the particular steps of the method of FIG. 6, this disclosure contemplates any suitable method for provisioning a cloud including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
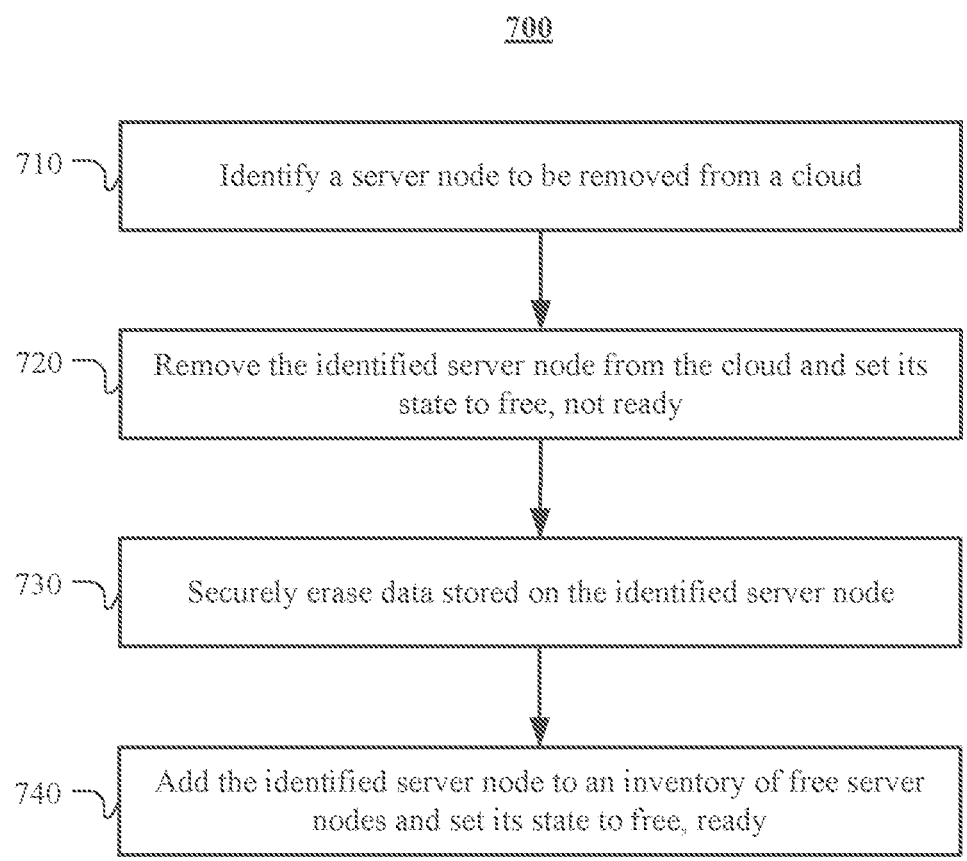
FIG. 7 illustrates an example method for removing a cloud server node from a cloud and adding the cloud server node to an inventory of free server nodes.

FIG. 7 illustrates an example method 700 for removing a cloud server node from a cloud and adding the cloud server node to an inventory of free server nodes. The method 700 may, at predetermined times or in response to particular events, seek out server nodes in the free, not ready state 408 and make them ready. The method 700 may be performed by a process that may execute on one or more server nodes. The method 700 may begin at step 710 by identifying an active server node to be removed from a cloud. At step 720, the method may remove the identified server node from the cloud and set its state to free, not ready. At step 730, the method may securely erase data stored on the identified server node.

At step 740, the method may add the identified server node to the free server node inventory 302. The state of the identified server node may be set to free, ready. As an example, referring to FIG. 2B, server node 212a of the private cloud 216 may be removed from the private cloud 216 when a customer using the server node 212a closes their user account. The server node 212a may then be securely erased and added to the free server node inventory 302. The preparation process of FIG. 5 may be subsequently performed on the server node 212a at a suitable time to add the server node 212a to a pool.

In particular embodiments, when a server node 212 in a private cloud 216 is no longer needed, e.g., because a user has decreased the capacity of the cloud 216, or the cloud 216 has been deleted, the server node's associated storage media may be securely erased and the server node may be added to an inventory of free server nodes. The server node may then be prepared and added to a pool of prepared nodes, from which it may subsequently be added to another cloud. FIG. 7 illustrates a method of removing a server node from a cloud and returning it to the inventory of free server nodes. As an example, referring to FIG. 2B, server node 212a of the private cloud 216 may be removed from the private cloud 216 when a customer using the server node 212a closes their user account. Referring to the state diagram 400 of FIG. 4, the state of server node 212a may transition from used, ready 404 to free, not ready 406 when it is removed from the cloud 216. The storage devices associated with server node 212a may be securely erased, e.g., by deleting self-encryption keys that are used to access the data stored on the storage devices. The state of server node 212a may then transition to free, ready 402, Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for removing a cloud server node from a cloud including the particular steps of the method of FIG. 7, this disclosure contemplates any suitable method for removing a cloud server node from a cloud including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
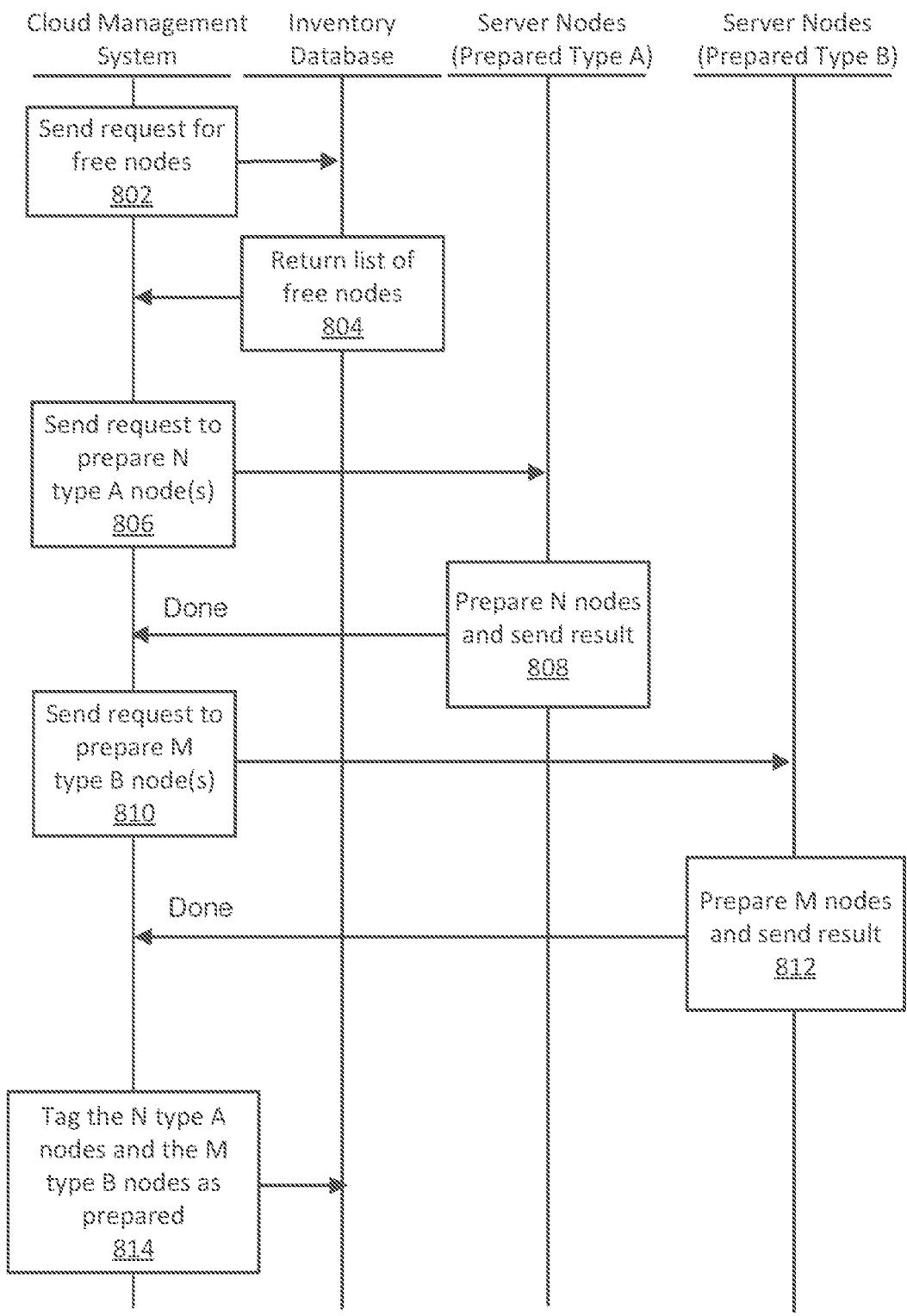
FIG. 8 illustrates an example interaction diagram for preparing cloud server nodes.

FIG. 8 illustrates an example interaction diagram for preparing cloud server nodes. A cloud preparation interaction may begin at block 802, in which a cloud management system of a cloud computing system sends a request for free nodes to an inventory database, which may be a component of the cloud computing system. At block 804, the inventory management database may, in response to the request for free nodes, identify one or more free nodes in an inventory of free nodes. The number of free nodes identified may be based on a number specified in the request 802, or may be determined based on factors such as the number of available free nodes, or other factors. The inventory database may return a list of identified free nodes to the cloud management system at block 804.

At block 806, the cloud management system may, in response to receiving the list of free nodes, determine a number of nodes of each prepared node type that that are to be prepared. For example, if there are two prepared node types named A and B, N nodes of prepared node type A are to be prepared, and M nodes of prepared node type B are to be prepared, then at block 806 the cloud management system may send requests to N server nodes to prepare according to prepared node type A, and at block 810 the cloud management system may send requests to M server nodes to prepare according to prepared node type B. At block 808, each of the N nodes may be prepared according to prepared node type A and send a "Done" result to the cloud management system indicating that the node has been prepared. Similarly, at block 812, each of the M nodes may be prepared according to prepared node type B and send a "Done" result to the cloud management system indicating that the node has been prepared. At block 814, the cloud management system may send a request to the inventory database to tag the N nodes as being prepared nodes of prepared node type A and the M nodes as being prepared nodes of prepared node type B.

Figure 9:
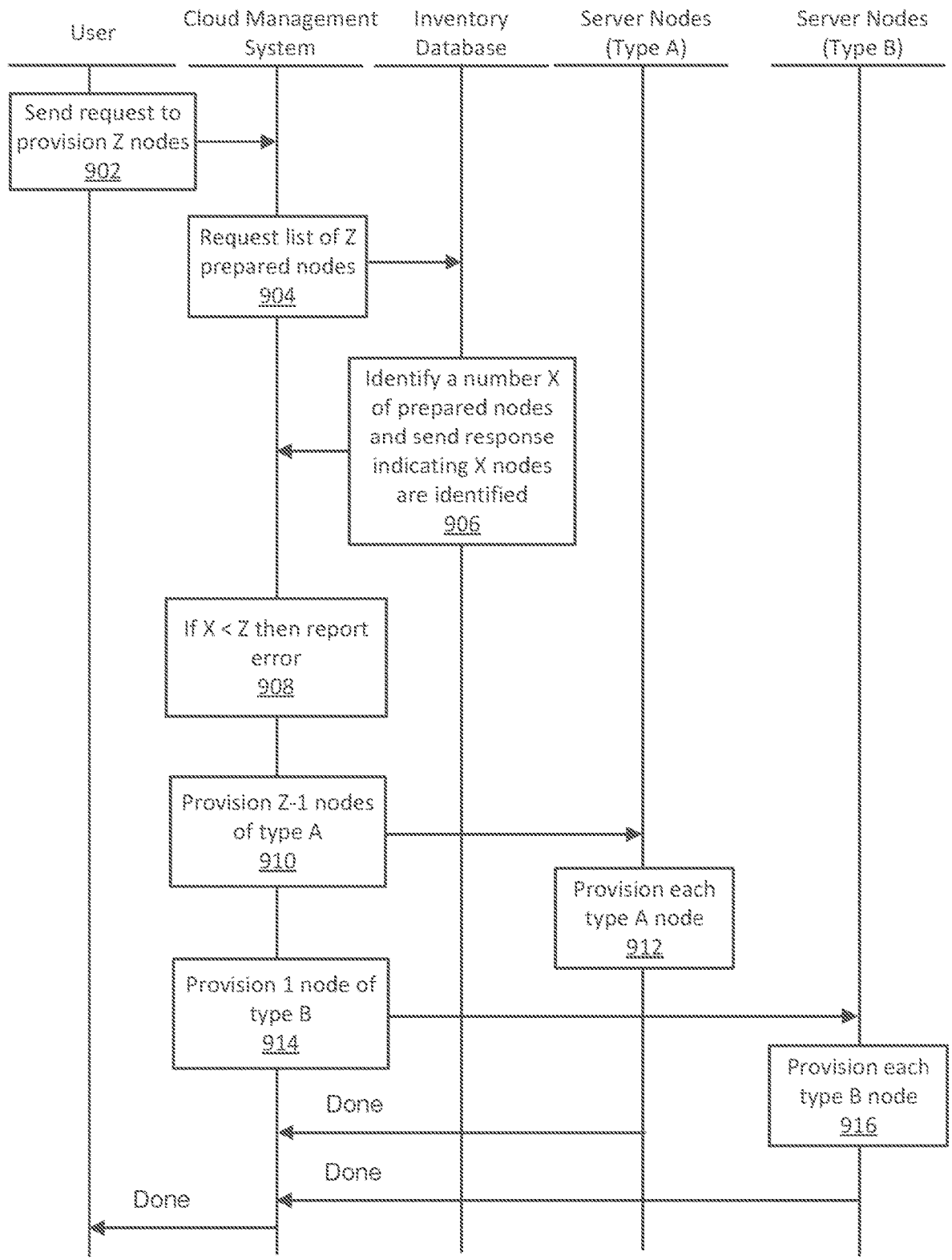
FIG. 9 illustrates an example interaction diagram for provisioning cloud server nodes.

FIG. 9 illustrates an example interaction diagram for provisioning cloud server nodes. A cloud provisioning interaction may begin at block 902, in which a user may send, to a cloud management system, a request to provision Z nodes for a cloud. At block 904, the cloud management system may, in response to the provisioning request, send a request for a list of Z prepared nodes to an inventory database. Block 904 may optionally determine which prepared node types are needed to satisfy the request from the user. The prepared node types may be determined based on information such as the particular cloud computing software that is to be used for the cloud being provisioned. For example, the cloud computing software may use N nodes of prepared node type A and 1 node of prepared node type B. The cloud management system may send a request for N nodes of prepared node type A and 1 node of prepared node type B to the inventory database at block 904.

The inventory database may receive the request for nodes sent by the cloud management system and identify a number of nodes of each requested preparation type and send the number of identified nodes (e.g., names or identifiers for the identified nodes) to the cloud management system at bock 906. Alternatively, the cloud management system may send a request for Z nodes to the inventory database at block 904 without determining which prepared node types to request or how many nodes of each prepared node type to request, and the inventory database may determine at block 906 which prepared node types are needed to satisfy the request from the user, as described above with respect to block 904, and send the number of identified nodes (e.g., names or identifiers) to the cloud management system at block 906. At block 908, the cloud management system may determine whether a sufficient number of nodes X (e.g., X>=Z) have been identified and returned by the inventory database. If not, e.g., X<Z, then the fast provisioning operation may fail. If a sufficient number of nodes have been identified, then at block 910 the inventory management system may send a request to each identified node of each prepared node type to provision the receiving node according to the prepared node type that corresponds to the receiving node. For example, according to the N:1 ratio, when a total of Z nodes have been identified by the inventory database, Z-1 nodes of prepared type A and 1 node of type B may be provisioned.

Each of those nodes may receive one of the requests at block 912 and provision according to prepared type A. Further, at block 914, the cloud management system may send a request to provision as prepared node type B to 1 node identified by the inventory database. A prepared type B node may receive the request at block 916 and provision according to type B. When each node is done provisioning, it may send a Done indication to the cloud management system. When the cloud management system has received a Done indication from all Z nodes, it may send a done request to the user indicating that the nodes have been provisioned. Optionally, the cloud management system may perform further provisioning operations, such as configuring the server nodes, before or after sending the Done indication to the user. For example, provisioning operations that need not complete by the time the Done indication is sent to the user may be started prior to or after sending the Done indication, and may continue after the done indication has been sent.

Figure 10:
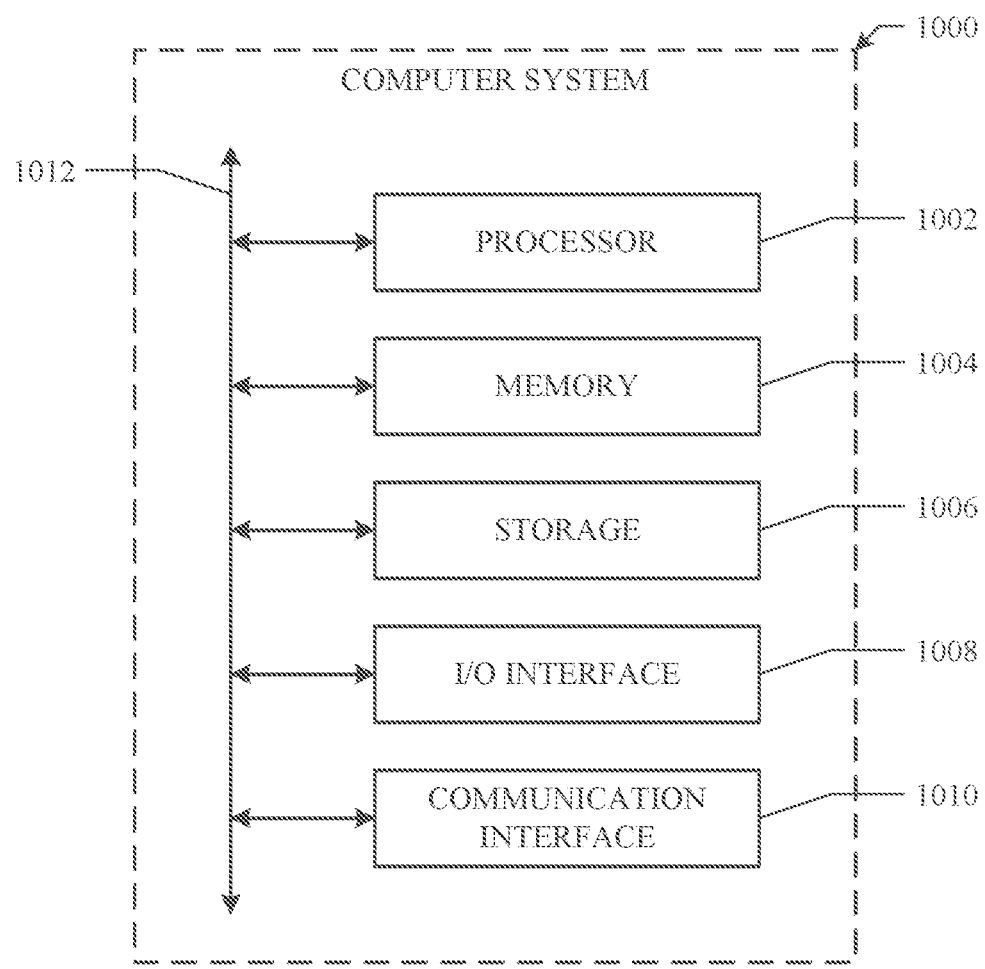
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method when executed on data processing hardware causes the data processing hardware to perform operations comprising:

receiving a cloud provisioning request requesting to provision a specified number of server nodes for a private cloud, the specified number of server nodes comprising at least one server node of a first node type and at least one server node of a second node type, the cloud provisioning request associated with a user of a plurality of users;

identifying the at least one server node of the first node type from a first node pool comprising a plurality of server nodes of the first node type, each server node of the first node type previously configured to perform a first set of operations;

identifying the at least one server node of the second node type from a second node pool comprising a plurality of server nodes of the second node type, each server node of the second node type previously configured to perform a second set of operations comprising server node management operations;

creating the private cloud by provisioning the identified at least one server node of the first node type and the identified at least one server node of the second node type to the private cloud;

providing the user associated with the cloud provisioning request access to the identified at least one server node of the first node type and the identified at least one server node of the second node type of the private cloud; and executing the identified at least one server node of the second node type of the private cloud to perform the server node management operations for the private cloud.

2. The computer-implemented method of claim 1, wherein the operations further comprise configuring user accounts and access control policies on the identified at least one server node of the first node type and the identified at least one server node of the second node type.

3. The computer-implemented method of claim 1, wherein the operations further comprise installing virtual storage and virtual networking components on the identified at least one server node of the first node type and the identified at least one server node of the second node type.

4. The computer-implemented method of claim 1, wherein the operations further comprise installing cloud management components on the identified at least one server node of the second node type subsequent to providing the user associated with the cloud provisioning request access to the identified at least one server node of the second node type.

5. The computer-implemented method of claim 1, wherein the operations further comprise removing the identified at least one server node of the first node type from the first node pool.

6. The computer-implemented method of claim 1, wherein the operations further comprise adding additional server nodes of the first node type to the first node pool.

7. The computer-implemented method of claim 1, wherein the operations further comprise removing the identified at least one server node of the second node type from the second node pool.

8. The computer-implemented method of claim 1, wherein the operations further comprise adding additional server nodes of the second node type to the second node pool.

9. The computer-implemented method of claim 1, wherein the operations further comprise receiving a subsequent cloud provisioning request requesting to provision a specified number of additional server nodes to the private cloud.

10. The computer-implemented method of claim 1, wherein the server node management operations comprise adding additional server nodes to the private cloud.

11. A system comprising:
data processing hardware; and
memory hardware in communication with the data processing hardware, the memory hardware storing instructions that when executed on the data processing hardware cause the data processing hardware to perform operations comprising:
receiving a cloud provisioning request requesting to provision a specified number of server nodes for a private cloud, the specified number of server nodes comprising at least one server node of a first node type and at least one server node of a second node type, the cloud provisioning request associated with a user of a plurality of users;
identifying the at least one server node of the first node type from a first node pool comprising a plurality of server nodes of the first node type, each server node of the first node type previously configured to perform a first set of operations;
identifying the at least one server node of the second node type from a second node pool comprising a plurality of server nodes of the second node type, each server node of the second node type previously configured to perform a second set of operations comprising server node management operations;
creating the private cloud by provisioning the identified at least one server node of the first node type and the identified at least one server node of the second node type to the private cloud;
providing the user associated with the cloud provisioning request access to the identified at least one server node of the first node type and the identified at least one server node of the second node type of the private cloud; and
executing the identified at least one server node of the second node type of the private cloud to perform the server node management operations for the private cloud.

12. The system of claim 11, wherein the operations further comprise configuring user accounts and access control policies on the identified at least one server node of the first node type and the identified at least one server node of the second node type.

13. The system of claim 11, wherein the operations further comprise installing virtual storage and virtual networking components on the identified at least one server node of the first node type and the identified at least one server node of the second node type.

14. The system of claim 11, wherein the operations further comprise installing cloud management components on the identified at least one server node of the second node type subsequent to providing the user associated with the cloud provisioning request access to the identified at least one server node of the second node type.

15. The system of claim 11, wherein the operations further comprise removing the identified at least one server node of the first node type from the first node pool.

16. The system of claim 11, wherein the operations further comprise adding additional server nodes of the first node type to the first node pool.

17. The system of claim 11, wherein the operations further comprise removing the identified at least one server node of the second node type from the second node pool.

18. The system of claim 11, wherein the operations further comprise adding additional server nodes of the second node type to the second node pool.

19. The system of claim 11, wherein the operations further comprise receiving a subsequent cloud provisioning request requesting to provision a specified number of additional server nodes to the private cloud.

20. The system of claim 11, wherein the server node management operations comprise adding additional server nodes to the private cloud.

* * * * *